United States Patent [19]

Supcoe et al.

[11] Patent Number: 5,554,214

[45] Date of Patent: Sep. 10, 1996

[54] WATER ABLATIVE COATING FOR VEHICLE DRAG REDUCTION

[75] Inventors: Robert F. Supcoe, Annapolis, Md.; Francis J. Moran, Concord, Calif.

[73] Assignee: The United States of America as represented by the Secretary of the Navy, Washington, D.C.

[21] Appl. No.: 722,299

[22] Filed: Sep. 3, 1976

[51] Int. Cl.$^6$ ........................................... B63B 1/34
[52] U.S. Cl. ........................ 106/264; 106/252; 523/175
[58] Field of Search ................... 114/20 R, 67 R; 260/42.29, 42.43, 42.54; 523/175; 106/311, 264

[56] References Cited

U.S. PATENT DOCUMENTS 3,575,123  4/1971  Shepherd et al. ................. 114/67 R
5,488,076  1/1996  Supcoe et al. ...................... 523/175

OTHER PUBLICATIONS

The Condensed Chemical Dictionary, 5th Ed, Reinhold Pub. Corp., New York, 1956, p. 871 (QD5 C5).

*Primary Examiner*—Charles T. Jordan
*Assistant Examiner*—A. Chi

[57] ABSTRACT

A exterior hull coating with drag reducing qualities for use on waterborne vehicles. The coating comprises a water-soluble polymer of high molecular weight in a vehicle, and a diluent, and contains a swelling deferent agent, driers, and pigments. The coating may be applied by the well-known techniques of brush painting rolling, and spraying. The coating ablates in a timed-release fashion into the fluid boundary layer adjacent to the vehicle skin to reduce drag by the reduction of turbulence and the promotion of laminar flow in the boundary layer.

9 Claims, No Drawings

WATER ABLATIVE COATING FOR VEHICLE DRAG REDUCTION

The invention described herein may be manufactured and used by or for the Government of the United States of America for governmental purposes without the payment of any royalties thereon or therefor.

BACKGROUND OF THE INVENTION

The invention relates to drag reduction of waterborne vehicles and more particularly to a water ablative paint coating having drag reducing properties.

Generally, the relative movement of a vehicle through a fluid, be it air or water, a surface vehicle or submerged, creates various drag forces on the vehicle's surface which impedes its forward movement. One form of drag is created by shear forces of the viscous fluid in the boundary layer immediately adjacent to the skin surface of a waterborne vehicle.

Another form of drag results from turbulent flow of the fluid as the vehicle passes through the fluid medium. At the bow of the vehicle, the fluid flow around the frontal contour is substantially laminar with no apparent evidence of roiliness. As the flow continues aft, the laminar flow becomes turbulent, contributing to drag or skin friction. The boundary layer separates from the vehicle skin thus creating a void or cavity in the fluid with a suction like effect. The result is that the vehicle cannot benefit or recover a thrust from a pressure rise at the tail or stern. In summary, all these drag forces together contribute to impeding forward motion of the vehicle through the fluid medium, thus causing a decrease in speed and/or an increase in power requirements.

Various studies, made in the past, have shown that polyethylene oxide and certain polyacrylamide resins possess properties that minimize drag or skin friction. With this knowledge, various prior art proposals have been made in order to provide a means whereby these drag reducing polymers may be introduced into the boundary layer. These proposals have included the injection of concentrated drag reducing polymer solutions into the boundary layer near the vehicle skin, and the application of drag reducing polymer coatings on the vehicle skin. The coating technique include applying a sheet material, spraying with powders at elevated temperatures, isostatic pressing, and coating with paints.

The disadvantage of the injection of the polymer into the boundary layer is that great quantities are used at high expense and recovery systems are not completely satisfactory. A disadvantage of the prior art coatings, no matter how applied, is their tendency to swell causing an increase in thickness, thus increasing the vehicle's size. Another disadvantage is that many coatings develop a flabby skin effect of a compliant coating. Both of these manifestations increasing drag.

SUMMARY OF THE INVENTION

Briefly the present invention overcomes the disadvantages of the prior art techniques of use, application, and formulation by providing an improved drag reducing ablative paint coating that is easy to apply in various thicknesses by brush, roller, or spray. Further, the coating has minimal swelling and does not develop the flabby skin effect of the compliant coatings. The net effect is that a much higher drag reduction results in the absence of the flabby skin. The constituents of the improved coating are a water-soluble polymer of high molecular weight suspended in a suitable vehicle (carrier) which may include diluents, which the coating mixture may also include solvation and film modifiers, driers and pigments. The film modifier may include an agent which defers swelling, which is best described as a powder coating applied over the surface of the drag reducing polymer particles. This coating regulates the speed of solvation of the polymer particles for even ablation.

After application the coating paint dries to the touch in 3–4 hours. When the waterborne vehicle is placed in the water, the coating begins to ablate, and as the waterborne vehicle passes through the fluid, enriches the boundary layer with the drag reducing polymer that reduces turbulence and promotes laminar flow.

STATEMENT OF THE OBJECTS OF THE INVENTION

Accordingly, an object of the present invention is to provide a new and improved water ablative coating that time-releases into the boundary layer for vehicle drag reduction.

It is a further object of the present invention to provide a water ablative, drag reducing paint that is easily formulated and then applied to the surface of a waterborne vehicle.

It is another object of the instant invention to provide a water ablative coating that has minimal swelling and therefore does not develop the flabby skin effect of the compliant coatings.

Other objects, advantages, and novel features of the invention will become apparent from the following detailed description of the invention wherein the preferred embodiment is particularly pointed out herein after in connection with the appended claims.

DESCRIPTION AND OPERATION OF THE PREFERRED EMBODIMENT

The basic mechanism of the water-ablative, drag-reducing coating formulation is a paint composition that, when applied to and dried onto a surface, has a lattice or cell-like structure containing therein water soluble resin polymers known to have vehicle drag reducing chracteristics. The water interacts with the polymer, or leaches it out, effecting a solution at the boundary layer that causes the coated surface to have a slippery, friction-reducing characteristic, that defers the formation of a turbulent regime thereby prolonging laminar flow when a vehicle is propelled through the water. The mechanism of the drag reducing phenomenon is explained by J. W. Hoyt in his article "Effect of Additives on Fluid Friction" where he states that the polymer molecules must interfer with the primary generation of turbulent eddies in a way that is substantially less dissipative than the eddy production itself. What he is saying in other words, is that the drag reducing resin promotes laminar flow by deferring the formation of a turbulent regime.

The paint formulation can be adjusted to regulate the leach rate of the drag reducing polymer. One improvement in this novel composition is the addition of a film swelling deferent as a film modifier constituent.

The basic formulation for the drag reducing paint comprises constitutents selected from the following groups of materials:

Group A) a high molecular weight polymer (drag reducing agent)

Group B ) a carrier or vehicle

Group C ) diluents

Group D) Solvation modifiers
Group E) film modifiers including a swelling deferent
Group F ) driers and pigments
The groups are further defined as follows:

A. High molecular Weight polymer

Any high molecular weight polymer resin in particulate form that is readily soluble in water and has drag reducing characteristics selected from the group consisting of polyethylene oxide (Polyox) resin, polyacrylamide resins, and any other material having the required properties. The "polyox" may be "WSR 301" manufactured by Union Carbide Corporation, described in their technical report by Stone and Stratta and also in the Encyclopedia of Polymer Science and Technology, Vol. 6, Wilmington, Del. The polyacrylamide may be "Seperan Ap 273" manufactured by Dow Chemical Company.

B. Carrier or Vehicle

Any long-chain oil alkyd resin for supporting the polymer resin and for forming a film which may be a silicone alkyd resin, such as "Mirasol R 3164" made by C. J. Osborn, Philadelphia.

C. Diluents

Any thinner or solvent to reduce viscosity for application of the coating by brush, roller, or spray such as mineral spirits, isopropanol, isobutanol, ethylene glycol monomethyl ether, and their mixtures may be used. The diluents must dissolve but not degrade the swelling deferring agent or the high molecular weight polymer. A homogenous mixture of the diluent, vehicle, and the swelling deferring agent must result.

D. Solvation Modifiers

Any hydrophobic, powdery solvation modifier (one that slows the rate of ablation), such as tricalcium phosphate manufactured by Stouffer Chemical Company or "Tullanox 500", a fumed silica, licensed to Tulco, Inc. of North Billerica, Mass., 01862.

E. Film Modifiers

Any materials which increase elasticity and reduce brittleness such as "Carbowax 1500" (a polyethylene glycol with a mol wt of 1500 made by Union Carbide Corporation and a material that defers film swelling and flabbiness, and thus regulates ablation, such as polyvinyl pyrrolidone (having a molecular wt of 25,000 and is water soluble) (PVP) manufactured by GAF Corporation and described in the Encyclopedia of Chemical Technology, Vol 21, 2nd Ed., John Wiley and Sons.

Group F) Driers and Pigments

Any well-known drier may be used to hasten the drying of a paint film, such as cobalt, manganese, and lead napthenate. Any pigment may be used as an aid in judging the uniformity of coverage, such as titanium dioxide or the like.

Method of Preparation

The method of preparation of the constituents of these formulations is best performed using a ball mill, and initially milling a paste composed of the high molecular weight polymer and the solvation modifier for about four hours to obtain a particle fineness of 5 or 6 on the Hegman gauge, or in other terms a particle size of 40–50 microns (270–325 mesh). The polymer is best precoated with the solvation modifier in a tumbler or shaker for 10 minutes before initial milling.

Added to this paste is the swelling deferring agent and the vehicle both of which have been predissolved in some diluent, and the film modifiers. This composition is finally ball milled for 16 hours for milling and mixing purposes. Upon completion of the milling, the charge is "let down" (diluted) to brush, roller, or spray viscosity. The driers and pigments are added as appropriate and the whole mixture is screened to remove lumps and oversize particles. The particle size is critical to obtain a smooth finish coat as well as to promote rapid solvation when the coated waterborne vehicle is immersed in water.

EXAMPLE I

An example of the basic formulation prepared in accordance with the above method is as follows:

| Constituent | % by wt. |
| --- | --- |
| Polyethylene Oxide ("WRS301") | 32.25 |
| Hydrophobic fumed silica ("Tullanox 500") | 3.25 |
| Silicone Alkyd Resin ("Mirasol R3164") | 32.25 |
| Swelling Deferent | 32.25 |
| (Polyvinylpyrrolidone) | 100.00% |

As discussed above the diluent is added to the formulation to get it to the desired viscosity.

This basic formulation example, when coated onto a substrate, such as the hull of a vehicle, will, when immersed in water, immediately start leaching out the water-soluble drag-reducing high molecular weight polymer along with the other non-active constituents. The coating would tend to swell and present a wrinkled and flabby surface due to the resin distribution in the imperfect film lattice except for the use of the swelling deferent and the pre-coating of the polymer with the hydrophobic fumed silica before the ball milling. The constituents then tend to delay water interaction, and by regulating solvation to effect a uniform leach rate to limit lattice distortion.

EXAMPLE II

An example of a modified basic formulation which is also prepared in accordance with the above method is as follows:

| Constituent | % by wt |
| --- | --- |
| Polyacrylamide Resin | 32.25 |
| Hydrophobic fumed silica ("Tullanox 500") | 3.25 |
| Silicone Alkyd Resin ("Mirasol R3164") | 32.25 |
| Swelling Deterent | 32.25 |
| (Polyvinylpyrrolidone) | 100.00% |

As discussed above the diluent is added to the formulation to "let it down" to desired viscosity. The modified formulation of Example II when coated on a substate will operate in substantially the same manner as Example I.

Obviously many modifications and variations in details, materials, and steps of the present invention are possible in light of the above teachings. It is therefore to be understood that within the scope of the appended claims the invention may be practiced otherwise than as specifically described.

What is claimed is:

1. A water ablative paint having drag reducing characteristics consisting essentially of:

a water-soluble high molecular weight polymer in particulate form;

a vehicle suspending and carrying said particulate polymer;

a solvation modifier that is hydrophobic and powdery in form coated on said particulate polymer; and film modifiers including a swelling deferent, that increase elasticity, reduce brittleness, and aid in even ablation of said polymer, and defers swelling of the film coating.

2. The composition for the water ablative paint of claim 1 further comprising:

driers for hastening the drying of the vehicle into a paint film coating.

3. The composition for the water ablative paint of claim 1 wherein the vehicle comprises:

a silicone alkyd resin.

4. The composition for the water ablative paint of claim 3 wherein the silicone alkyd resin is:

Silicone Modified Long Oil soya alkyd.

5. The composition for the water ablative paint of claim 1 wherein said film modifiers further includes:

a polyethylene glycol having a molecular weight of 1500 to increase the elasticity of the film coating.

6. The composition for the water ablative paint of claim 1 wherein said film modifiers includes:

polyvinylpyrrolidone that aids in even ablation of said polymer and avoids swelling of the film coating.

7. The composition for the water ablative paint of claim 1 wherein said driers are selected from a group consisting essentially of:

cobalt, manganese, and lead naphenate.

8. The composition for the water ablative paint of claim 1 wherein the water-soluble high-molecular weight polymer comprises:

a polyethylene oxide resin.

9. The composition for the water ablative paint of claim 1 wherein the water-soluble high-molecular weight polymer comprises:

a polyacrylamide resin.

* * * * *